United States Patent Office 3,421,382
Patented Jan. 14, 1969

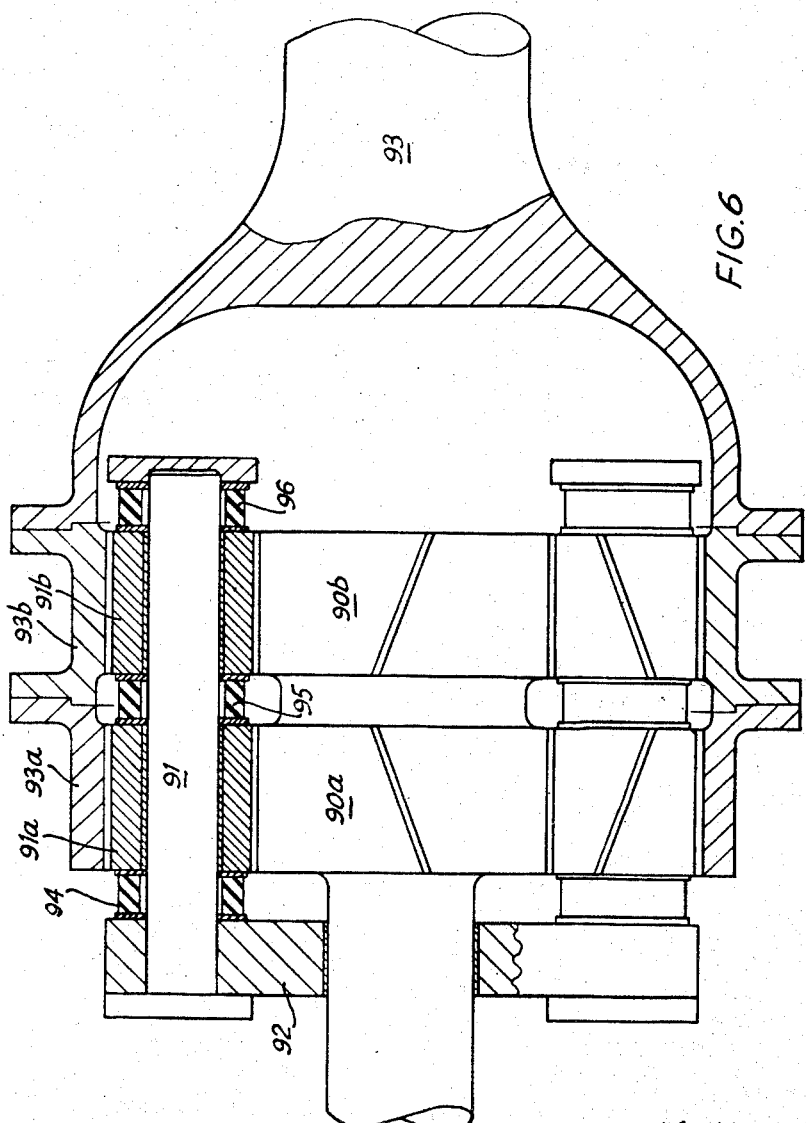

3,421,382
POWER TRANSMISSION GEARING WITH MEANS FOR CANCELING LOAD-GENERATED FORCES
John Anthony Henshaw, Maple, and Kenneth Ellis Lea, High Lane, Stockport, England, assignors to Mirrlees National Limited, a corporation of Great Britain
Filed Feb. 28, 1967, Ser. No. 623,793
U.S. Cl. 74—410        14 Claims
Int. Cl. F16h *1/00*

ABSTRACT OF THE DISCLOSURE

Power transmission gearing consisting of coaxial input and output shafts, a double helical gear on the input shaft, a double helical gear on the output shaft, at least one two-part set of gear members complementary to the double helical gears, the parts of each set of gear members being capable of relatively small axial and rotational movements, cushion means located against the parts forming each set of gear members to provide reaction forces opposed to the load-generated axial forces in these sets of gear members.

---

This invention relates to power transmission gearing and in particular to heavy duty gearing (by which expression is meant power transmission of the order of 3,000 to 20,000 B.H.P. and over) of the kind hereinafter termed the kind referred to comprising two common gear members coupled by other gear members forming a plurality of parallel gear trains.

The expression "common gear members" is used to include not only a gear member of unitary construction but also an assembly of two or more gear members, as in the case of a double helical gear member.

An example of such gearing is an epicyclic gear or differential or like gear having a plurality of planetary pinions or layshafts respectively forming parallel gear trains coupling common sun and annulus gear members in an epicyclic gear or common input and output gear members in a differential or like layshaft gear.

A major problem in the design of such gearing is to obtain distribution of load as between the several parallel gear trains. This problem is, of course, more serious in the design of heavy duty gearing. In the design of gearing generally and especially layshaft gearing, it is accepted that there is a practical limit to the axial length or tooth length of gear pinions, due to the effect of torsional distortion under load, since the torque is often applied to or taken from one end of the said common pinions, so that some means other than merely increasing the length of the pinions, has to be found to increase the load-carrying capacity of the gearing. One such other means is to incorporate a plurality of layshafts, or in the case of epicyclic gearing, a plurality of planetary gears, so as to provide a plurality of parallel gear trains, but unfortunately it is well known that equality of load-distribution between the several parallel gear trains thus provided is in practice more theoretical than actual, so that the actual rating of such a gearing designed with long toothed pinions or with a plurality of parallel gear trains is considerably lower than its theoretical rating should be, due to the torsional distortion and inequality of load distribution aforesaid.

One object of the present invention is an improved construction of power transmission gearing of the kind referred to, with automatic individual load limitation or intertrain load distribution as between the several parallel gear trains so as to enable larger power than hitherto possible to be handled in the gear unit of a given size.

Another object of the invention is to enable, in effect, the length of the gear pinions of layshaft or epicyclic gears to be extended while avoiding the practical length limit of torsional distortion aforesaid so again as to increase the load-carrying capacity of a gear unit, while maintaining an effective degree of load distribution amongst the parallel gear trains.

Yet another object of the invention, is to overcome the factor of limitation aforesaid and at the same time to contain some of the resultant forces directly as between adjacent gear trains which forces would otherwise have to be transmitted through the gearbox casing.

A still further object of the invention is to provide improved means for damping the effect of cyclic load variations, either input or output, applied to the transmission gearing, thereby to avoid resonance and like surge problems which can have drastic results.

A multi-layshaft gear unit is known embodying helical gearing on simple layshafts so arranged as to transmit the axial thrusts of the respective layshafts to a mechanical system of levers at one end of the gear thereby to obtain an equal thrust load on each layshaft and consequently, in theory, a truly equal distribution of the total transmission load amongst the several layshafts of the gear.

The present invention is based primarily on the appreciation that in the aforesaid known gearing the intertransmission of all load-sharing forces in gearing employing simple layshafts or nongrouped planetary pinions has been, and can only be, effected through, or by reaction from, the gear housing or some part external to the gear members themselves and upon the conception of a duplex or compound layshaft or several planetary pinions forming a gear group within which load-sharing forces may be contained.

According to the invention power transmission gearing comprising two common gear members coupled by other gear members forming a plurality of parallel gear trains is characterised in that some at least of said other gear members are arranged in a coaxial group of at least two gear members in number in such manner as to permit relative axial off-loading movement between the gears of said groups by reason of helical gear teeth and means resisting such relative axial movement by forces contained within the group so as to share the load between them.

The power transmission gearing aforesaid may be further characterised by means permitting relative off-loading movement between said other gears in a plurality of groups or between any such group and at least one other gear member not being part of a group but all forming parallel gear trains, in combination with means resisting such movement by forces not contained within a group.

In the accompanying drawings:

FIG. 6 shows an epicyclic gear made in accordance with another example of the invention.

Figure 1:
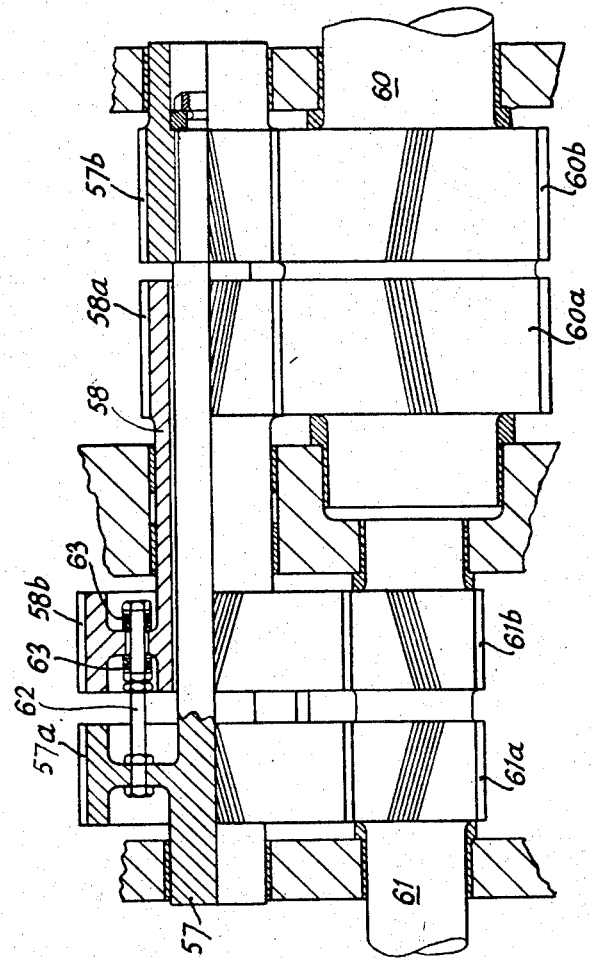
FIG. 1 is a diagrammatic longitudinal section of part of a 4:1 reduction gear unit made in accordance with one example of the present invention but showing only one of three compounds or duplex layshafts.
Figure 2:
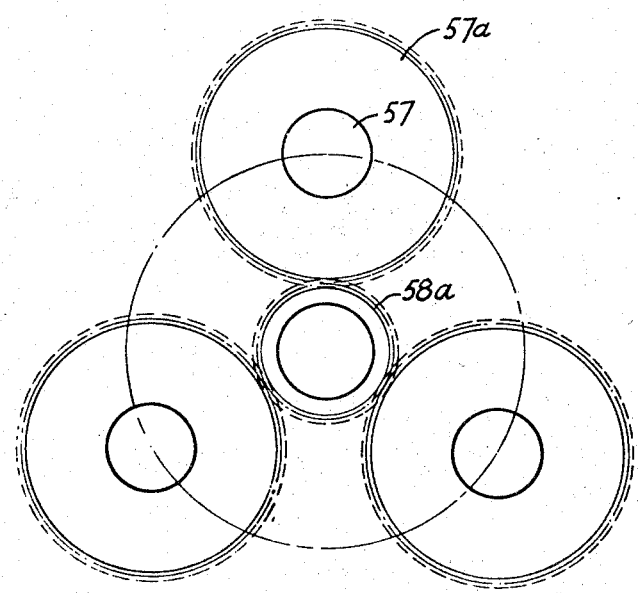
FIG. 2 is a diagrammatic end view of the gear unit shown in FIG. 1.

As shown diagrammatically in FIGS. 1 and 2 each layshaft is duplex or compound comprising concentric inner and outer shafts 57 and 58. The inner shaft 57 carries helical end pinions 57a and 57b of like hand but not necessarily equal angle helix. In fact because the tooth loads at the right hand ends of each shaft and the resultant axial thrusts will be opposed to those at the left-hand end, each shaft of the compound layshaft as shown has a 15 degree helix angle at the left hand pinion wheels and a 10 degree angle at the right hand pinion wheels to provide a resultant axial thrust of appropriate proportion and direction. The outer shaft 58, journalled thereon for small axial and rotational movements has helical end pinions 58a and 58b. The helix angle of these pinion wheels is similar but opposite to that of the pinions 57a and 57b. The helices are preferably selected so that the axial thrust on the shaft 57 will be equal and opposite to that on the shaft 58 thereby avoiding lateral loading of each compound layshaft as a whole. The helically cut pinions 58a, 57b, 57a and 58b mesh with complementary pinions 60a, 60b, on the output shaft 60 and 61a, 61b on the input shaft 61 which are at fixed spacing on those shafts. Consequently there is no relative rotary movement between the coaxial layshafts 57 and 58 until any relative axial movements of said shafts occurs, and is then only minimal and in proportion thereto. Between the pinions 57a and 58b is a rubber cushion assembly consisting of a plurality of bolts 62 secured to the web of the pinion 58a and passing through arcuate clearance slots in the web of the adjacent pinion 58b, such bolts carrying rubber bushes 63 on each side of such latter web, which bushes are preloaded. The rubber cushion assembly of each pair of coaxial layshafts is necessarily dynamically balanced.

With such arrangement, in operation axial thrusts generated in the layshafts will be self-canceling on the compound helical pinions of the common input and output shafts, and will also share the load equally. Also the maximum number of layshafts of a given size around the common input and output gearwheels can be doubled and by a proportional increase in the overall length of the gear unit, the load capacity of the gear unit as a whole can be doubled without the problem of known torsional distortion inherent in longer pinions, since the individual pinions need not be longer than that which would be required for the same number of simple layshafts.

Figure 3:
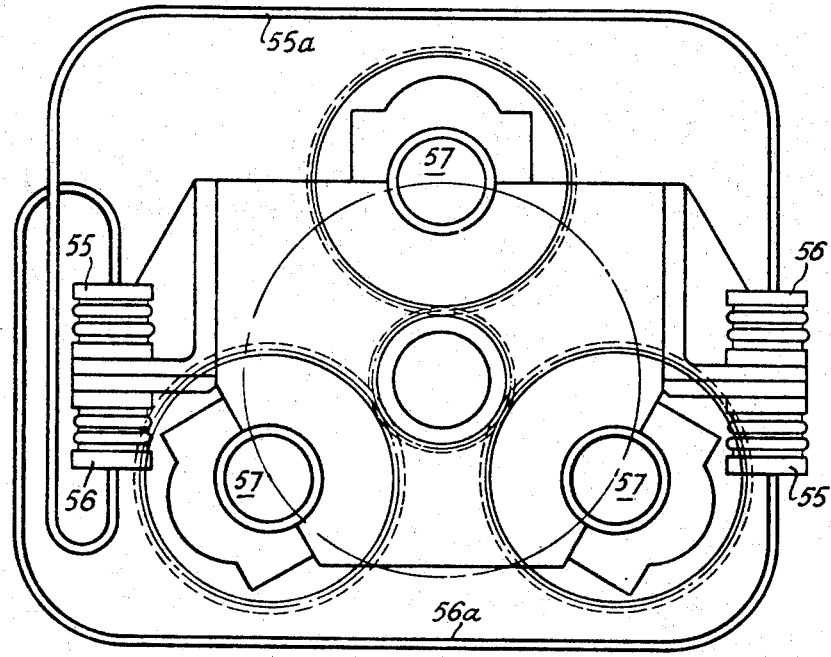
FIG. 3 is a diagrammatic end elevation of a modification of a gear shown in FIGS. 1 and 2.

As shown in FIG. 3, in order to provide additional damping for shock or cyclic loads, the central bearing bracket and the bearing plates for the layshafts 57 may be constructed for part rotational movement within the gear box casing and opposed pairs of air cushions, or air springs 55, 56 are provided, which may be coupled together by pneumatic lines 55a, 56a, complementary to lugs of which only 52a on brackets 52 at one end are shown.

With such arrangement the centre framework and the end bearing plates are loaded against one of the pair of air-springs 55 or 56, which, in the manner of all air springs, damp out shock loads or cyclic loads which latter as is well known can cause so much serious damage by setting up resonance.

Figure 4:
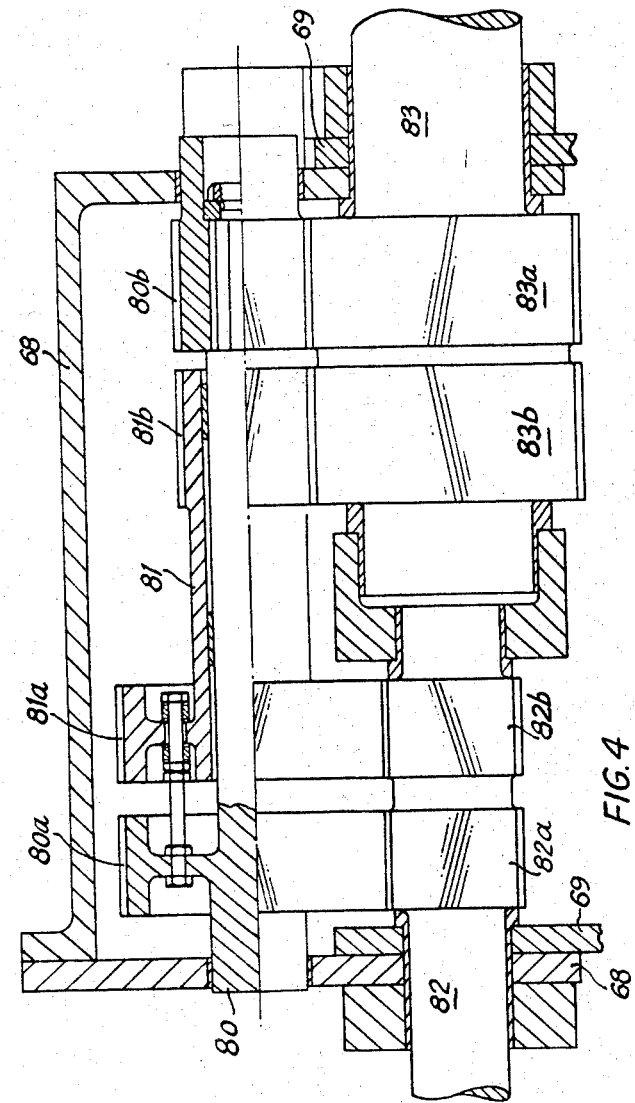
FIGS. 4 and 5 are diagrammatic longitudinal and end elevations showing another example of a compound layshaft gear made in accordance with the present invention.
Figure 5:
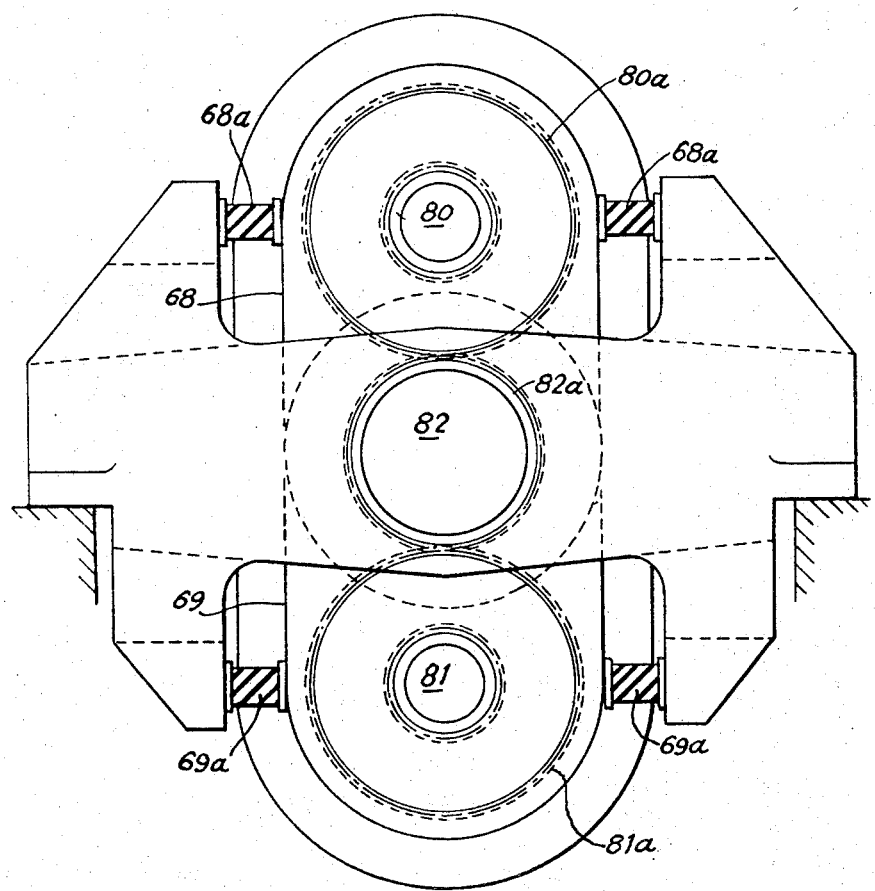

As shown in FIGS. 4 and 5 compound layshafts 80, 81 with complementary pairs of pinions 80a, 80b and 81a, 81b complementary to double helical pinions 82a, 82b, 83a, 83b on the input and output shafts 82 and 83 respectively. These compound layshafts are carried by U-shaped arms 68, 69 so as to be rotatable about the common axis of the shafts 82, 83, such rotation being constrained by rubber cushions 68a, 69a. In operation with such modification the torque load will be taken by the cushions 68a, 69a which will allow relative load distribution as between the shafts carried by the arms 68 and 69 while the load distribution as between the individual parts 80 and 81 of the compound layshafts will depend upon relative axial movements thereof under control of rubber bushes 63 as shown and described with reference to FIG. 1.

As shown in FIG. 6 parallel gear trains are provided in an epicyclic gear having an input shaft 90 carrying single opposed helical sun pinions 90a and 90b. The complementary planetary pinions 91a, 91b are carried on stub axles 91 fixed in a stationary planet cage 92. A pair of complementary annuli or gear rings 93a, 93b are split to enable assembly to be effected and are carried by an output shaft 93. Rubber cushion members indicated at 94, 95 and 96 are provided which in operation enable the planetary pinions 91a and 91b to move towards or away from each other according to the axial loads generated at their helical teeth, thereby to distribute the total load not only as between themselves but also as regards other pairs of sun pinions also meshing with the same sun pinions and annulus ring of the gearing, a second pair of such other pinions being shown and given the same reference characters.

Where helically cut gearwheels are used for obtaining an axial movement with resultant relative rotary movement in the coupling to the two common members necessary for off-loading and/or on-loading it follows that:

(a) If the helices are of the same hand at each end of a layshaft the helix angles must not be such that the unique condition of zero end thrust exists. The resultant axial thrust however in a gear having a ratio other than 1:1 will be the differential of the thrust at the two ends and whatever may be the selected helix angles, i.e., whether the same at each end or different, these will balance out so that there will be equal and opposite displacement of the coaxial shafts as the working load varies;

(b) If the helices are of different hand at each end of a layshaft the resultant axial thrusts from the ends will be additive and the helix angles may be the same as each other, or different, the choice of angle enabling the resultant axial thrust to be within acceptable and useful proportions.

What is claimed is:

1. Power transmission gearing comprising coaxial input and output shafts, a double helical gear on said input shaft, a double helical gear on said output shaft, at least one two-part set of gear members complementary to the said double helical gears, the parts of each set of gear members being capable of small relative axial and rotational movements, rubber cushion means located against the parts forming each set of gear members to provide reaction forces opposed to load generated axial forces in said sets of gear members.

2. Gearing according to claim 1 wherein said set of gear members comprises a pair of coaxially arranged layshaft parts each having a helical gear at each end thereof, said helical gears of one part of said layshaft parts meshing with one of said double helical gears of said input shaft and one of said double helical gears on said output shaft, the helical gears of said other part of said layshaft meshing with the other helical gear of said double helical gear of said input and said output shafts.

3. Power transmission gearing according to claim 2, further characterised in that each pair of layshafts is carried by a U-shaped arm, means mounting said arm for movement about the common axis of the coaxial shafts and reaction means resisting said movement.

4. Power transmission gearing according to claim 2 wherein there are three of said coaxial shafts, each group comprising two relatively axially movable members, said groups being disposed at substantially 120° intervals around the coaxial shafts, said means to provide a reaction force consisting of a rubber cushion means comprising a plurality of bolts secured to a first web of a gear on one of a pair of said coaxially arranged layshafts and passing through arcuate clearance slots in a second web of an adjacent gear on another of said pair of layshafts, said bolts carrying rubber bushes on each side of said second web, said bushes being preloaded.

5. Power transmission gearing according to claim 4 wherein there is provided a central bearing bracket in which the coaxial shafts of the common gear members and coaxial groups are journaled, said bracket being adapted for partial rotational movement within a casing, at least two opposed sets of fluid cushions mounted between said bracket and said casing, each of said sets of cushions having an upper side and a lower side, each of said sides of the sets of cushions being mounted between said bracket and said casing, fluid connections between said upper side of one cushion to said lower side of the other cushion and between said lower side of said one cushion to said upper side of said other cushion, whereby cyclic and shock leads are dampened.

6. Power transmission gearing according to claim 2 comprising said layshafts carried by U-shaped arms, said arms rotatable about the common axis of said coaxial shafts, said arms restrained from rotation by rubber cushions between said arms and a fixed body.

7. Power transmission gearing according to claim 2 further characterised in that the shock and resonance damping means comprises air cushion means.

8. Power transmission gearing according to claim 1 further characterised by a frame carrying said set of gear members, mounting means for said frame permitting movement about the common axis of the coaxial shafts and shock and resonance damping means resisting said movement.

9. Power transmission gearing according to claim 8 further characterised in that the said reaction means comprise rubber cushions located on each side of each said U-shaped arm.

10. Power transmission gearing according to claim 1 further characterised by means for preloading said rubber cushion means.

11. Power transmission gearing according to claim 10 further characterised in that the rubber cushion means comprises a dynamically balanced group of studs fixed in one gear wheel of the pair of layshafts, complementary arcuate slots in the adjacent gear wheel on the other shaft of the pair of layshafts, rubber cushion means located on said studs on each side of said adjacent gear wheel and means on said stud for preloading the said rubber means.

12. Power transmission gearing comprising common sun and planetary members and complementary planetary members the said sun pinion and an annulus each being double helical gears, the planetary members comprising at least one pair of planetary pinions each pinion of a pair being complementary to one part of the said double helical sun and annulus members to form a pair of parallel gear trains, the said planetary pinions of each pair being mounted on a common axle carried by a planet cage member and relatively slidable and rotatable thereon and reaction means mounted on said axle to oppose said relative slidable movement of the planetary pinions.

13. Power transmission gearing according to claim 12 characterised in that the reaction means comprise rubber cushion members mounted between and against the outer faces of the planetary gears of each pair.

14. A gearing system comprising an input shaft carrying single opposed helical sun pinions, complementary planetary pinions on stub axles fixed in a stationary planet cage, a pair of annular gears surrounding said shaft and said planetary pinions and coaxial with said shaft, an output shaft connected to one of said annular gears, rubber cushion members between said planetary pinions, and further rubber cushion members between each of said planetary pinions and body fixed as to axial motion relative to said axles.

References Cited

UNITED STATES PATENTS

| | | | |
|---|---|---|---|
| 1,209,108 | 12/1916 | Bohuszewicz | 74—410 X |
| 1,293,047 | 2/1919 | Davies | 74—410 |
| 1,847,611 | 3/1932 | Hodgkinson | 74—410 |
| 2,516,077 | 7/1950 | Schmitter | 74—410 |
| 2,700,311 | 1/1955 | Bade | 74—410 X |

FOREIGN PATENTS 205,806     1925    Great Britain.

DONLEY J. STOCKING, *Primary Examiner.*

L. H. GERIN, *Assistant Examiner.*